US007143725B1

United States Patent
Hu

(10) Patent No.: US 7,143,725 B1
(45) Date of Patent: Dec. 5, 2006

(54) DUAL SIX-STROKE SELF-COOLING INTERNAL COMBUSTION ENGINE

(76) Inventor: Lung Tan Hu, 25755 48th Avenue, Aldergrove, BC (CA) V4W 1J6

(*) Notice: Subject to any disclaimer, the term of this patent is extended or adjusted under 35 U.S.C. 154(b) by 0 days.

(21) Appl. No.: 11/284,228

(22) Filed: Nov. 22, 2005

(51) Int. Cl.
F02B 75/20 (2006.01)
(52) U.S. Cl. .................................. 123/64; 123/58.7
(58) Field of Classification Search ................ 123/64, 123/58.1, 58.7, 58.8
See application file for complete search history.

(56) References Cited

U.S. PATENT DOCUMENTS

| | | | | |
|---|---|---|---|---|
| 4,159,699 A | * | 7/1979 | McCrum | 123/58.8 |
| 4,159,700 A | * | 7/1979 | McCrum | 123/58.8 |
| 4,202,300 A | * | 5/1980 | Skay | 123/432 |
| 4,917,054 A | * | 4/1990 | Schmitz | 123/58.8 |
| 5,699,758 A | * | 12/1997 | Clarke | 123/21 |
| 6,918,358 B1 | * | 7/2005 | Hu | 123/58.8 |
| 2002/0050253 A1 | * | 5/2002 | Schmitz | 123/64 |
| 2004/0123821 A1 | * | 7/2004 | Hu | 123/58.8 |

* cited by examiner

Primary Examiner—Marguerite McMahon

(57) ABSTRACT

The present invention provides a dual six-stroke self-cooling internal combustion engine which utilizes a turbo and a cooling cylinder to compress cool air onto the engine head and reduce the engine temperature. The present invention greatly reduces the size and the manufacture cost of the cooling equipments such as radiator and intercooler by cooling the power cylinder from within. In addition, the present invention slightly increases the fuel efficiency and reduces the exhaust temperature.

7 Claims, 11 Drawing Sheets

DUAL SIX-STROKE SELF-COOLING INTERNAL COMBUSTION ENGINE

BACKGROUND OF THE INVENTION

Cooling equipment is one essential component for internal combustion engine as the engine temperature directly affects the overall durability, performance, and manufacture cost. My research has led me in the direction of providing an unlimited compression ratio cooling cylinder combined with a charge-intake to reduce the engine temperature. This self-cooling internal combustion engine requires a basic unit of two four-cycle power cylinders and one cooling cylinder and a charge-intake device to utilize energy of power stroke and exhaust to cool down the temperature of the engine head from within after combustion process of each power stroke completes. Said two power cylinders are arranged with 180 degree of crankshaft rotation apart and said cooling cylinder is trailing the primary power cylinder by approximately 90 degree of crankshaft rotation; said cooling cylinder initiate a flow of compressed cool air into each power cylinder approximately 60 degree of crankshaft rotation after ignition of each power cylinder. The working medium within the power cylinder is approximately over 2000 degree for gasoline right after the ignition, when the compressed cool air flows into the power cylinder, the compressed cool air is blown up onto the inner surface of the engine head, creating a cool air barrier beneath the inner surface of the engine head and absorbing the heat of the combustion, therefore the engine head temperature and exhaust temperature is greatly reduced.

The prior art shows that various inventors have suggested a structure consisting of two four-cycle power cylinders and one air-fuel charging cylinder; one representative of such structure is U.S. Pat. No. 4,202,300, the major differences between these types of engines and the present invention are that the charging cylinder of the prior art requires variable volume and fuel input, and the objective is to force additional air-fuel mixture into the power cylinder before the ignition of power cylinders, these types of engines utilize the charging cylinder to increase the amount of air-fuel mixture in each combustion process thereby increasing the engine temperature and power output. Another significant difference is that the size of the cooling cylinder of the present invention is approximately the same as that of the power cylinders for cooling purpose while other prior art has a relatively small charging cylinder for air-fuel compressing purpose.

Another type of engine structure shown in the prior art has one primary cylinder connected to one secondary power cylinder, even though the secondary power cylinder only has air input, the objective of this type of engine is to prolong the combustion process and increase the fuel economy. The major difference is that the basic structure of the present invention is based on a concept of dual six-stroke operation, and the cooling cylinder only provides cooling effect to the engine, the cooling cylinder cannot provide any power output while the objective of the prior art is to generate power output from both primary and secondary power cylinders.

The most preferable type of charge-intake of the present invention is a turbo type. The exhaust ports of the primary power cylinder and the secondary power cylinder are connected to the input side of the turbo, while the compressor discharge side of the turbo is connected to the cooling cylinder; this is also another objective to the present invention to utilize energy of the exhaust to cool down the engine from within, this embodiment can possibly eliminate the needs for additional cooling equipments such as radiators and intercoolers, therefore its applications can extend to the vehicle engines running on severe condition territory such as desert. Since the need of radiator is eliminated, the engine reliability under severe weather condition is greatly improved.

It is also possible to employ a super-charge or other type of charge-intake on the present invention for other applications. For small engines such as the one powering a lawn mower, the cost of the intake-charge might over-weigh the value of the engine, the engine can still be constructed with normal air-intake.

SUMMARY OF THE INVENTION

It is the primary objective of the present invention to provide a self-cooling internal combustion engine capable of cooling its operation temperature with its own energy.

It is the secondary objective of the present invention to provide a self-cooling internal combustion engine capable of operation with less or none additional cooling equipment, thereby decreasing the weight the entire engine.

It is another objective of the present invention to provide a self-cooling internal combustion engine which requires a low manufacture cost.

It is yet another objective of the present invention to provide a self-cooling internal combustion engine which has a lower exhaust temperature.

DETAILED DESCRIPTION OF THE PREFERRED EMBODIMENTS

It should be understood that the drawings are simplified for clarification purpose and common parts of engines such as spark plugs are omitted.

Figure 1:
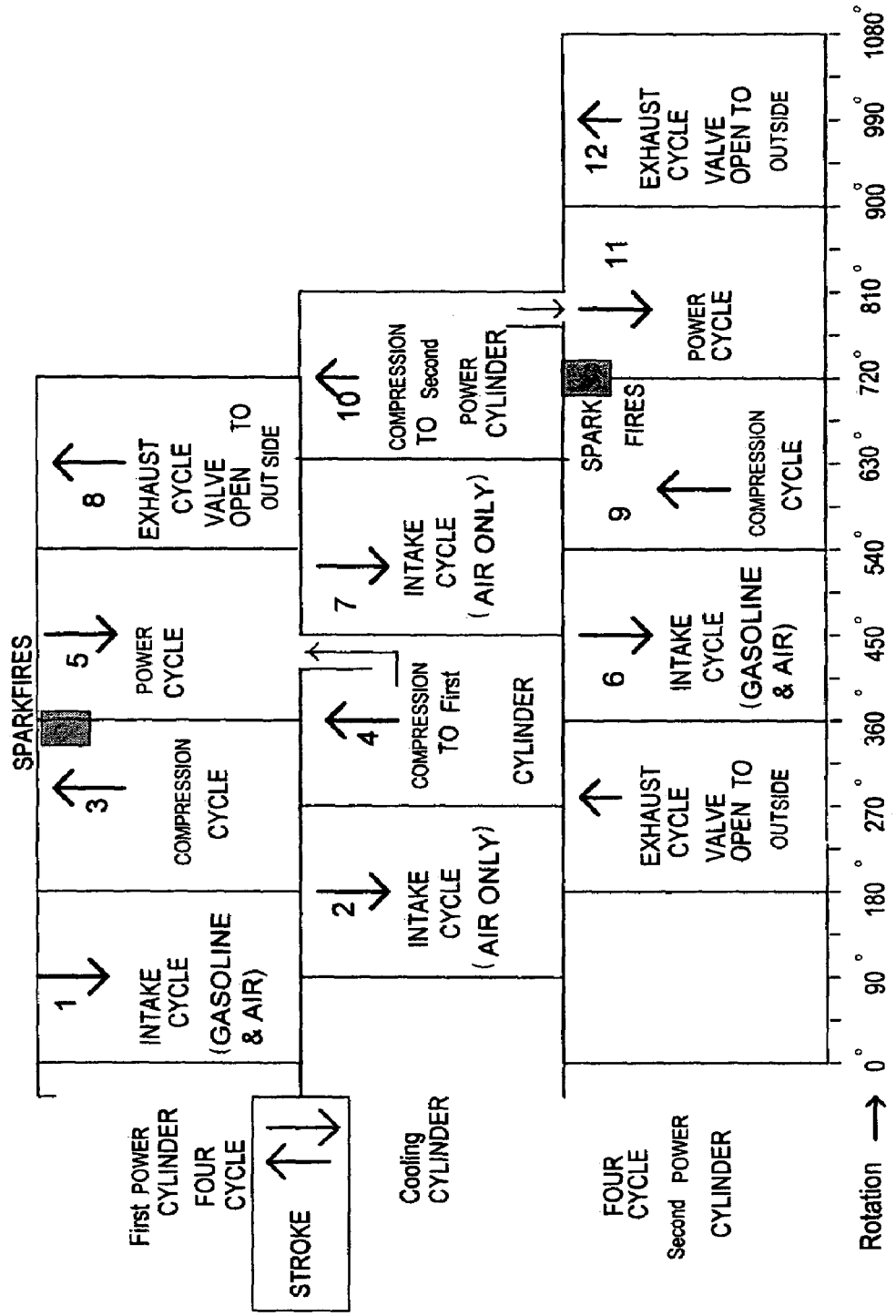
FIG. 1 is the standard working procedure of one working cycle of the dual six-stroke internal combustion engine.

FIG. 1 is the standard working procedure of one working cycle, and it should be understood that minor angle adjustments may be applied for engines designed for different applications and specifications.

Figure 3:
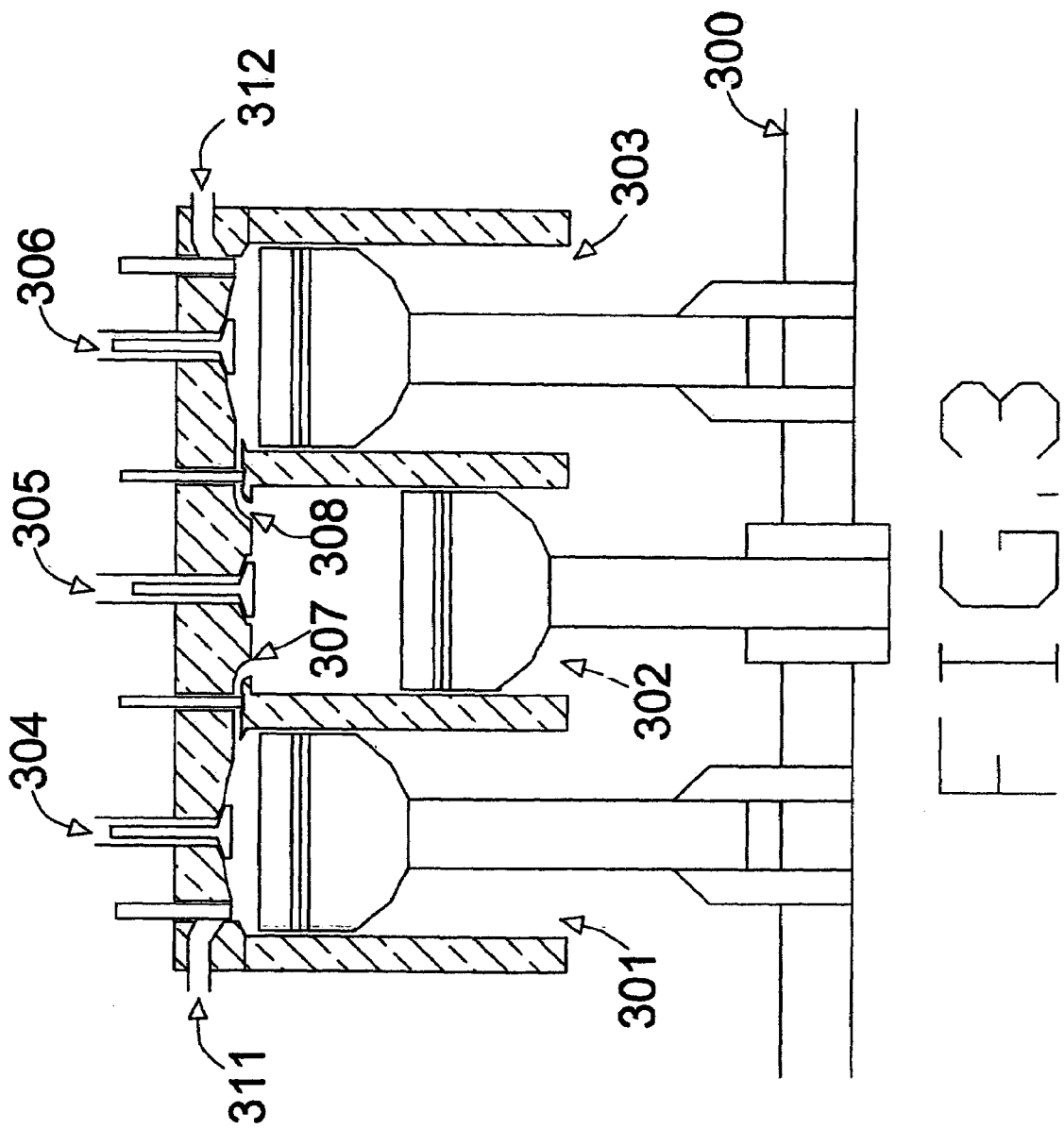
FIG. 3 is a sectional diagram of the basic unit of the dual six-stroke self-cooling internal combustion engine.
Figure 4:
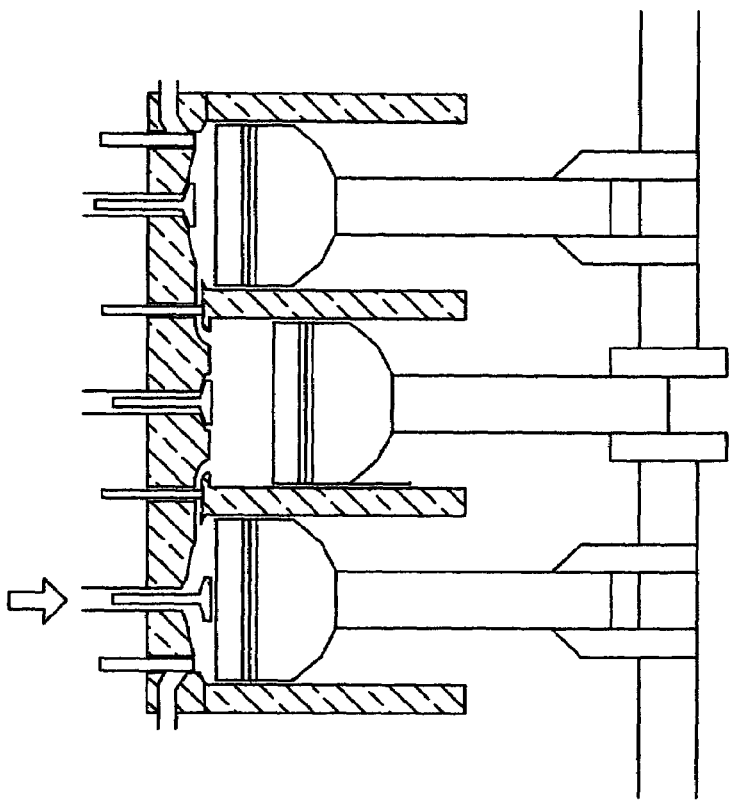
FIG. 4 to FIG. 11 are the sectional diagrams of the dual six-stroke self-cooling internal combustion engine at the beginning of each stroke.
Figure 5:
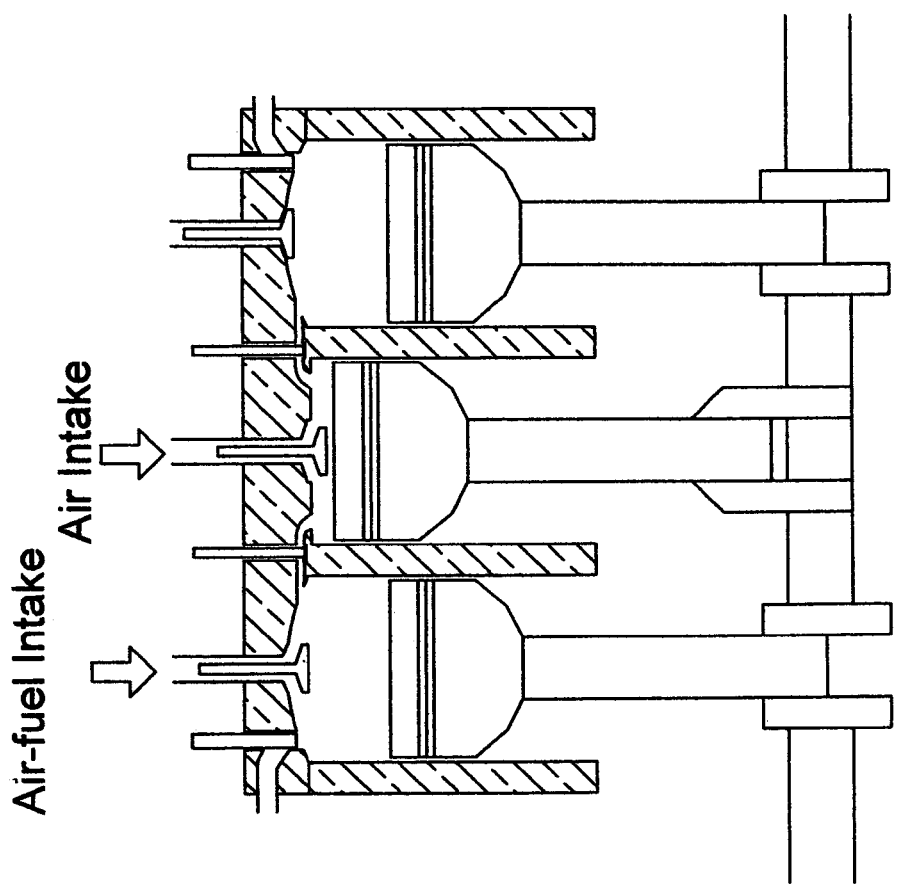
Figure 6:
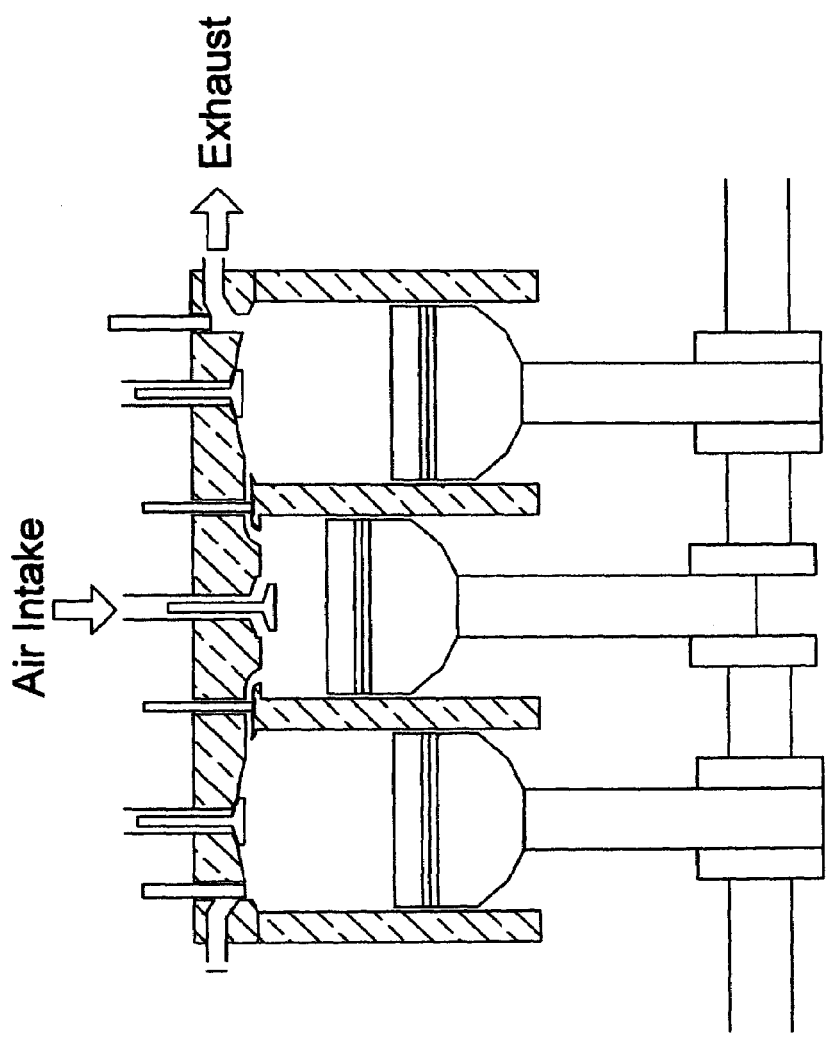
Figure 7:
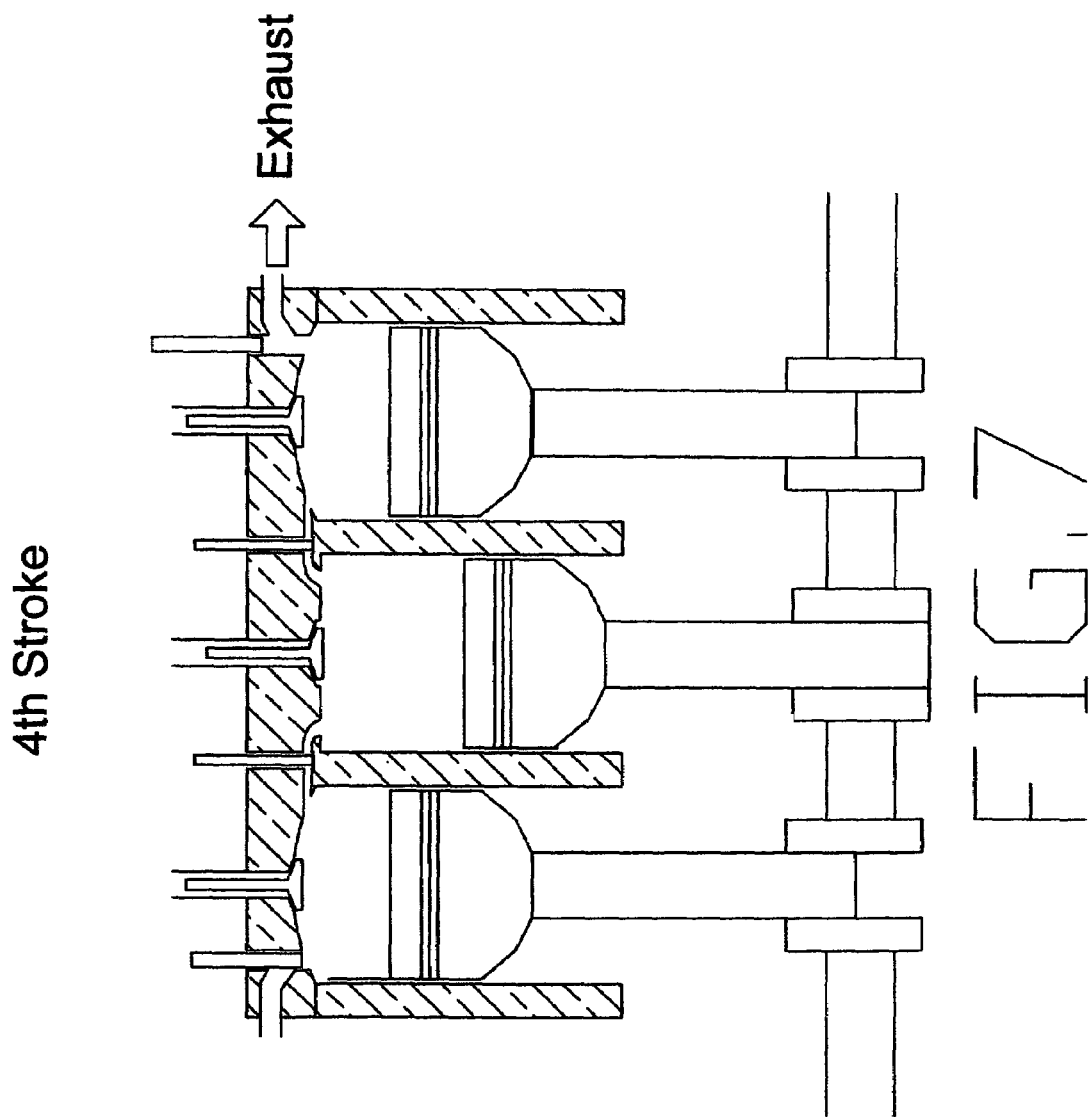
Figure 8:
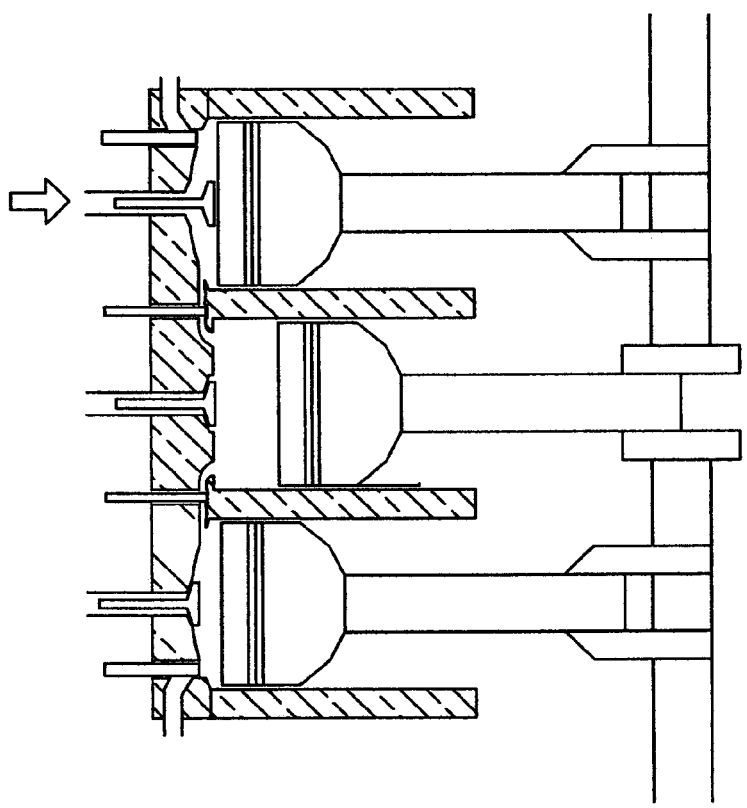
Figure 9:
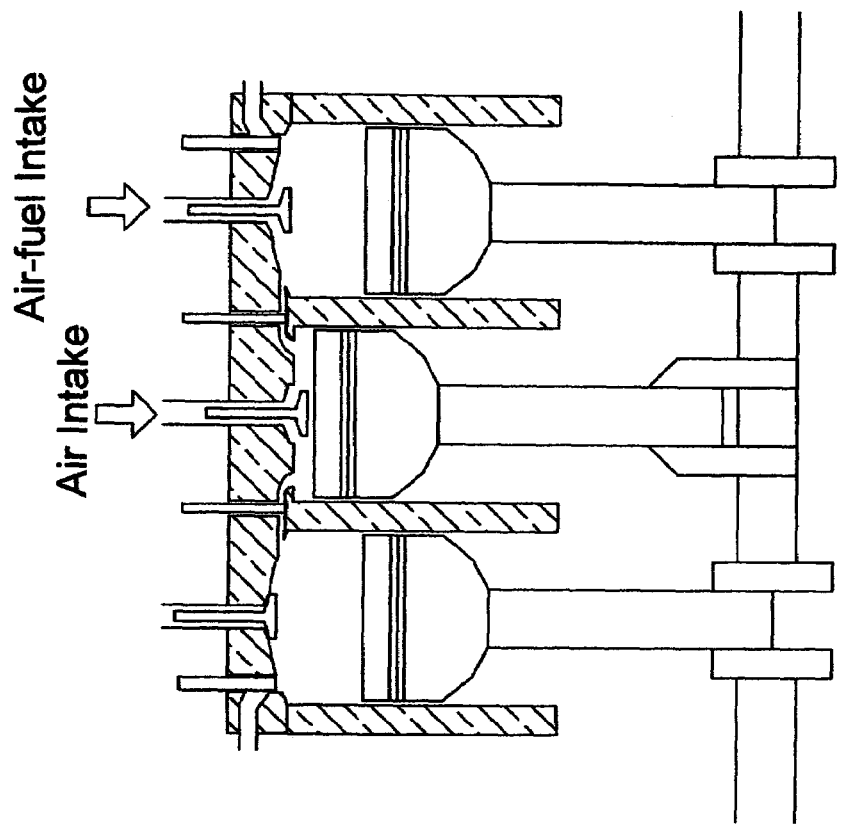
Figure 10:
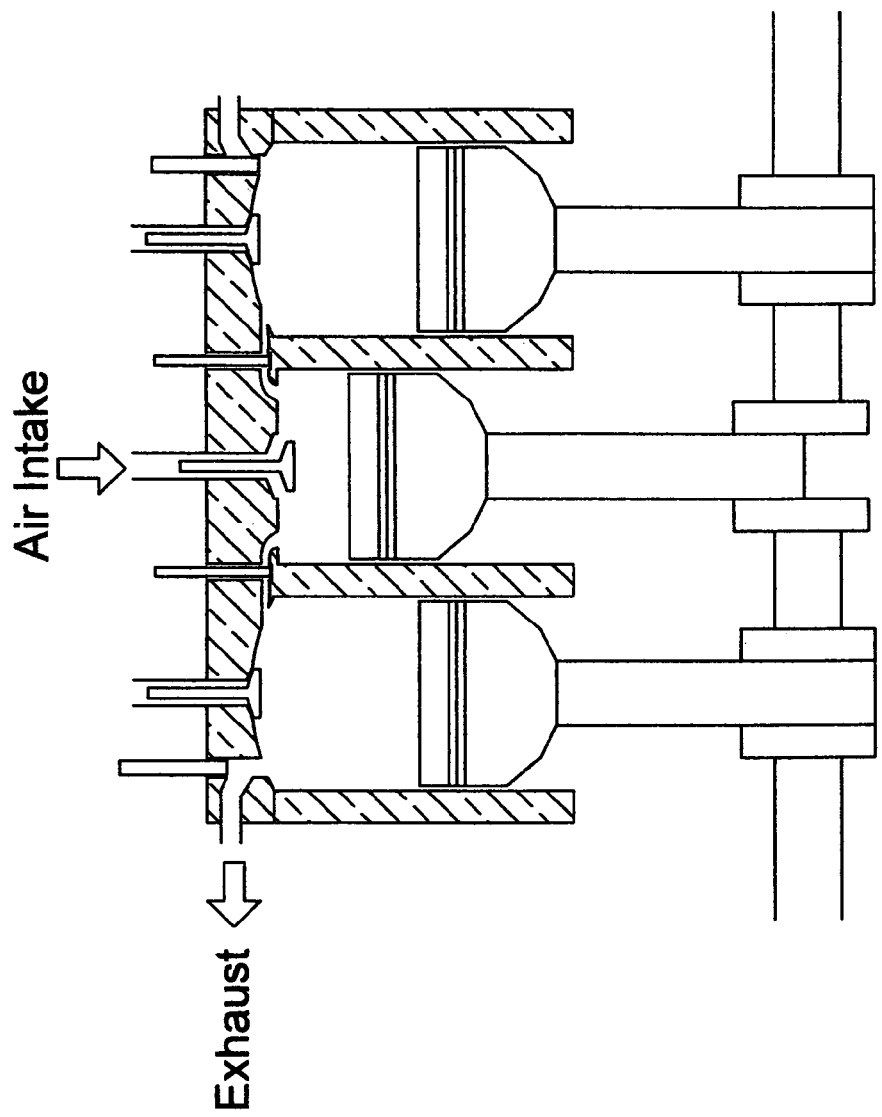
Figure 11:
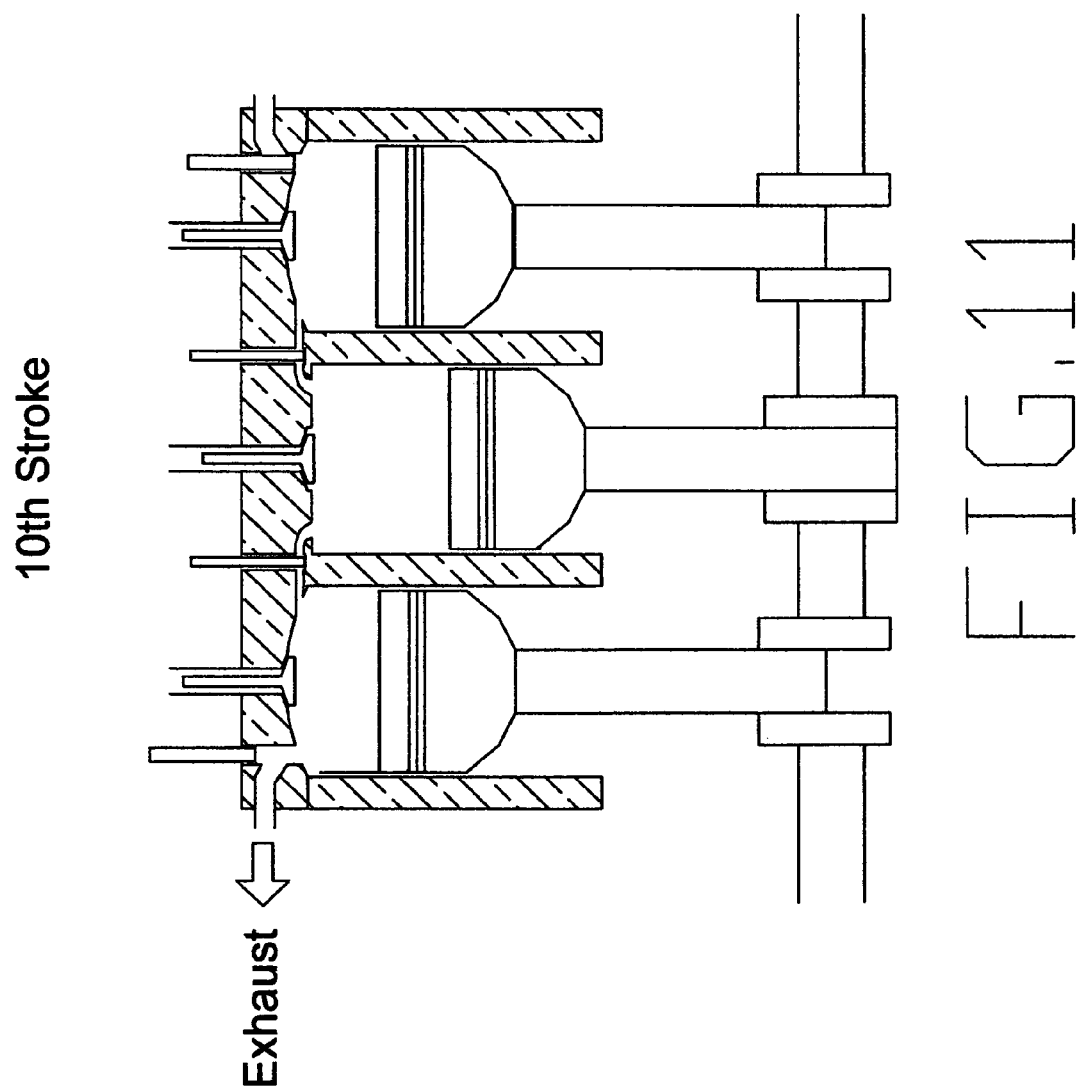

FIG. 3 shows the basic unit of the dual six-stroke internal combustion engine. The primary power cylinder 301, the secondary power cylinder 303, and the cooling cylinder 302 are connected to the crankshaft 300. The primary power cylinder 301 starts air-fuel intake stroke at 0 degree of crankshaft angle. The secondary power cylinder 303 starts air-fuel intake stroke at 360 degree of crankshaft angle. The cooling cylinder 302 starts the first air intake stroke at 90 degree of crankshaft angle, and the second air intake stroke starts at 450 degree of crankshaft angle. Each working cycle consists of twelve strokes, and each stroke repeats every 720 degree of crankshaft rotation.

Figure 2:
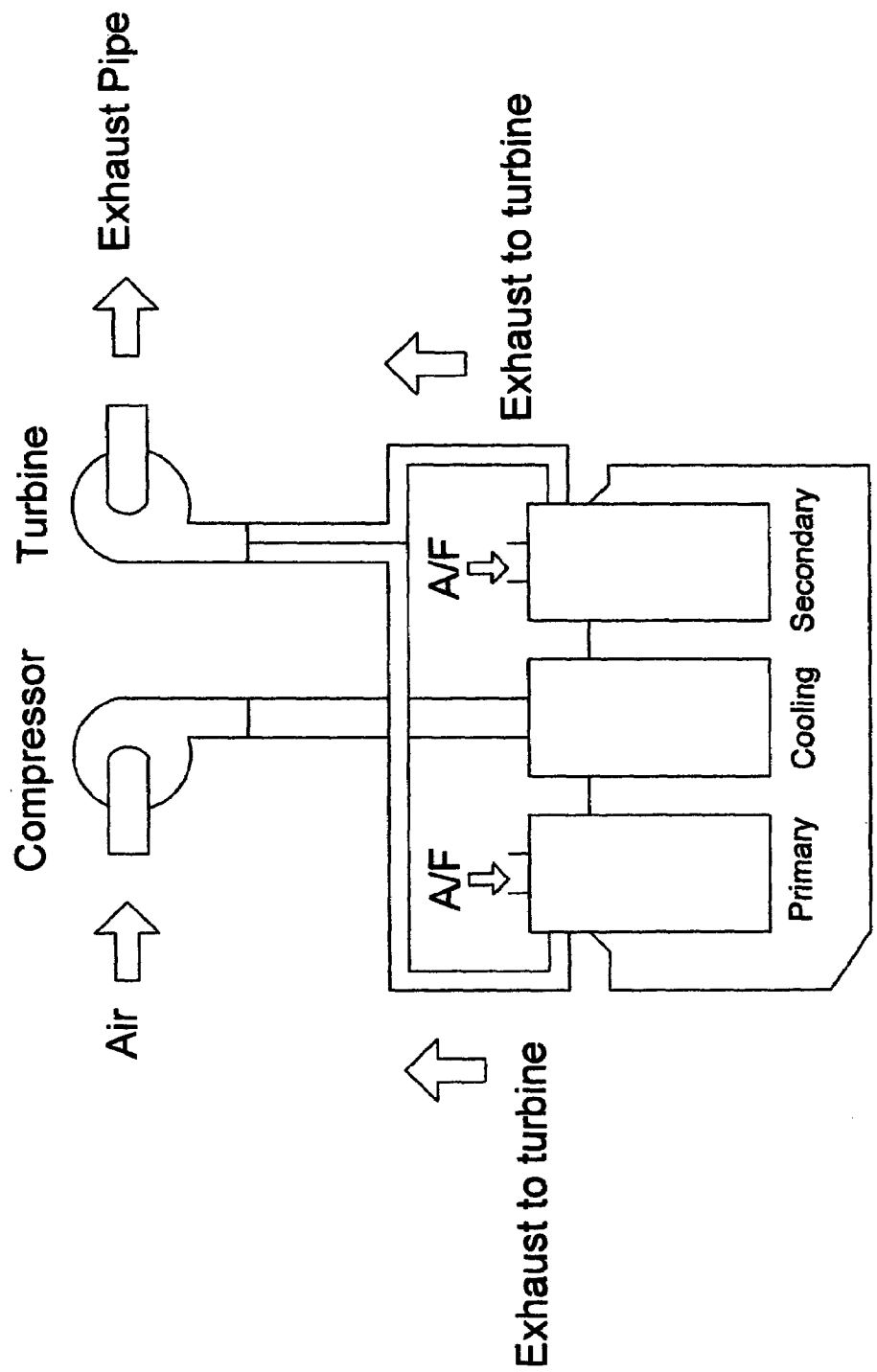
FIG. 2 is a simple illustrative diagram of the first embodiment of the present invention.

Referring now to FIG. 2, the air-fuel mixture is supplied into the primary power cylinder 301 and the secondary power cylinder 303 through the primary intake port 304 and the secondary intake port 306 respectively. The primary exhaust port 311 and the secondary exhaust port 312 are connected to the turbine of the turbo, and the compressor of the turbo is connected to the cooling cylinder intake port 305, thereby supplying high volume of compressed air into cooling cylinder 302.

The primary coordinating port 307 and the secondary coordinating port 308 provide passage for the compressed cool air from the cooling cylinder 302 into the primary power cylinder 301 and the secondary power cylinder 303 respectively, whereby the coordinating ports in both the primary power cylinder 301 and the secondary power cylinder 303 are designed to forced the compressed cool air to blow onto the inner surface of the engine head in the respective power cylinders. The compress ratio of the cooling cylinder 302 is unlimited, thereby the compressed cool air in the cooling cylinder 302 is completely compressed into the primary power cylinder 301 and the secondary power cylinder 303 at the end of the first compression stroke and the second compression stroke respectively.

Referring now to FIG. 1 and FIG. 4 to FIG. 11, first stroke is the intake stroke of the primary power cylinder 301, the primary power cylinder 301 is supplied with air-fuel mixture, operating from 0 degree to 180 degree of crankshaft angle.

Second stroke is the first intake stroke of the cooling cylinder 302, the cooling cylinder 302 is supplied with air only from the compressor of the turbo, operating from 90 degree to 270 degree of crankshaft angle.

Third stroke is the compression stroke of the primary power cylinder 301, the air-fuel mixture inside the primary power cylinder 301 is compressed and ignited at designed crankshaft angle, operating from 180 degree to 360 degree of crankshaft angle.

Fourth stroke is the first compression stroke of the cooling cylinder 302, the cool air inside the cooling cylinder 302 is compressed from 270 degree to 450 degree of crankshaft angle, whereby the primary coordinating port 307 is open from approximately 420 degree to 450 degree of crankshaft angle, allowing passage of the compressed cool air into the primary power cylinder 301; the compressed cool air is blown onto the inner surface of the engine head, creating a cool air barrier to absorb the heat from the engine head and the expanding working medium.

Fifth stroke is the expansion stroke of the primary power cylinder 301, operating from 360 degree to 540 degree of crankshaft angle; after the combustion process of the air-fuel mixture inside the primary power cylinder 301, the compressed cool air absorbs the heat from the engine head and mixes with the working medium, thereby instantly lowering the temperature of the working medium inside the primary power cylinder 301.

Sixth stroke is the intake stroke of the secondary power cylinder 303, the secondary power cylinder 303 is supplied with air-fuel mixture, operating from 360 degree to 540 degree of crankshaft angle.

Seventh stroke is the second intake stroke of the cooling cylinder 302, the cooling cylinder 302 is supplied with air only from the compressor of the turbo, operating from 450 degree to 630 degree of crankshaft angle.

Eighth stroke is the exhaust stroke of the primary power cylinder 301, the working medium is compressed out through the primary exhaust port 311, operating from 540 degree to 720 degree of crankshaft angle.

Ninth stroke is the compression stroke of the secondary power cylinder 303, the air-fuel mixture inside the secondary power cylinder 303 is compressed and ignited at designed crankshaft angle, operating from 540 degree to 720 degree of crankshaft angle.

Tenth stroke is the second compression stroke of the cooling cylinder 302, the cool air inside the cooling cylinder 302 is compressed from 630 degree to 810 degree of crankshaft angle, whereby the secondary coordinating port 308 is open from approximately 780 degree to 810 degree of crankshaft angle, allowing passage of the compressed cool air into the secondary power cylinder 303; the compressed cool air is blown onto the inner surface of the engine head, creating a cool air barrier to absorb the heat from the engine head and the expanding working medium.

Eleventh stroke is the expansion stroke of the secondary power cylinder 303, operating from 720 degree to 900 degree of crankshaft angle; after the combustion process of the air-fuel mixture inside the secondary power cylinder 303, the compressed cool air absorbs the heat from the engine head and mixes with the working medium, thereby instantly lowering the temperature of the working medium inside the secondary power cylinder 303.

Twelfth stroke is the exhaust stroke of the secondary power cylinder 303, the working medium is compressed out through the secondary exhaust port 312, operating from 900 degree to 1080 degree of crankshaft angle.

It is also possible to employ a super-charge or other type of charge-intake on the present invention for other applications. For small engines such as the one powering a lawn mower, the cost of the intake-charge might over-weigh the value of the engine, the 8-stroke cycle rotary engine can still be constructed with normal air-intake.

The working cycle of said primary power cylinder 301 always leads the working cycle of said secondary power cylinder 303 by 360 degree of crankshaft rotation, the standard trailing angle between the working cycles of said cooling cylinder 302 and said primary power cylinder 301 is 90 degree of crankshaft rotation, however, the trailing angle can be adjusted from 75 degree to 95 degree of crankshaft rotation for embodiments of the present invention with different applications or different fuel types.

The standard valve opening time for the said coordinating ports is 30 degree of crankshaft rotation, however, depending on the fuel types and the engine load conditions, the valve opening time can be adjusted from 25 degree to 45 degree of crankshaft rotation.

The present invention can be applied in diesel type, propane type, and gasoline type of engines with proper fuel supplying means, and it should be understood that various modifications can be made without leaving the spirit and scoop of the present invention.

The invention claimed is:

1. A dual six-stroke self-cooling internal combustion engine having a basic unit and a working cycle comprising:
   a) at least a primary power cylinder and ignition means;
   b) at least a secondary power cylinder and ignition means;
   c) at least one cooling cylinder and a piston;
   d) means for introducing and firing a fuel-air mixture for said primary power cylinder and said secondary power cylinder respectively;
   e) means for intaking air into said cooling cylinder;
   f) means for coordinating and transferring air from said cooling cylinder to said primary power cylinder;
   g) means for coordinating and transferring air from said cooling cylinder to said secondary power cylinder;
   h) a primary power cylinder exhausting port and a secondary power cylinder exhausting port;

i) a turbo connecting with said primary power cylinder exhaust port and said secondary power exhaust port for providing high volume of air intake into said cooling cylinder;

j) first stroke intaking air-fuel mixture into said primary power cylinder from 0 degree to 180 degree of crankshaft angle;

k) second stroke intaking air only into said cooling cylinder from 90 degree to 270 degree of crankshaft angle;

l) third stroke compressing air-fuel mixture inside said primary power cylinder from 180 degree to 360 degree of crankshaft angle;

m) fourth stroke compressing air inside said cooling cylinder from 270 degree to 450 degree of crankshaft angle;

n) fifth stroke igniting said primary power cylinder at designed angle and producing the first power stroke from 360 degree to 540 degree of crankshaft angle, wherein the compressed air inside said cooling cylinder is pushed into said primary power cylinder from approximately 420 degree to 450 degree of crankshaft angle;

o) sixth stroke intaking air-fuel mixture into said secondary power cylinder from 360 degree to 540 degree of crankshaft angle;

p) seventh stroke intaking air only into said cooling cylinder from 450 degree to 630 degree of crankshaft angle;

q) eighth stroke exhausting the working medium out of said primary power cylinder from 540 degree to 720 degree of crankshaft angle;

r) ninth stroke compressing air-fuel mixture inside said secondary power cylinder from 540 degree to 720 degree of crankshaft angle;

s) tenth stroke compressing air inside said cooling cylinder from 630 degree 810 degree of crankshaft angle;

t) eleventh stroke igniting said secondary power cylinder at designed angle and producing the second power stroke from 630 degree to 810 degree of crankshaft angle, wherein the compressed air inside said cooling cylinder is pushed into said secondary power cylinder from approximately 780 degree to 810 degree of crankshaft angle;

u) twelfth stroke exhausting working medium out of secondary power cylinder from 900 degree to 1080 degree of crankshaft angle; each cylinder completes one of its own working cycle in 720 degree rotation of crankshaft angle.

2. A dual six-stroke self-cooling internal combustion engine comprising:

a) a primary power cylinder and ignition means;
b) a secondary power cylinder and ignition means;
c) a cooling cylinder with an air intake port and valve control means;
d) a common crankshaft connecting said primary power cylinder and said secondary power cylinder and said cooling cylinder;
d) a primary power cylinder air-fuel intake port and valve control means;
e) a secondary power cylinder air-fuel intake port and valve control means;
f) a primary power cylinder exhaust port and valve control means;
g) a secondary power cylinder exhaust port and valve control means;
i) a primary coordinating port and valve control means for providing passage of air flow from cooling cylinder onto the top of said primary power cylinder;
h) a secondary coordinating port and valve control means providing passage of air flow from cooling cylinder onto the top of said secondary power cylinder;
i) said primary power cylinder starts air-fuel intake stroke at 0 degree of crankshaft angle, said secondary power cylinder starts air-fuel intake stroke at 360 degree of crankshaft angle, said cooling cylinder starts first air intake stroke at 90 degree of crankshaft angle and second air intake stroke at 450 degree of crankshaft angle; each working cycle consists of twelve strokes, and each stroke repeats every 720 degree of crankshaft rotation;
j) said dual six-stroke self-cooling engine utilizes its own energy to produce the first and second cooling stroke after each combustion process in said primary power cylinder and said secondary power cylinder, wherein the first cooling stroke compressed the cool air inside said cooling cylinder into said primary power cylinder from 420 degree to 450 degree of crankshaft angle, the second cooling stroke compressed the cool air inside said cooling cylinder into said secondary power cylinder from 780 degree to 810 degree of crankshaft angle;
k) the exiting direction of the compressed cool air from said coordinating port into each power cylinder is set towards the top of each said power cylinder, thereby said cooling stroke creating a compressed cool air barrier between the inner surface of the engine head and the working medium inside each said power cylinder after combustion process to reduce the temperature of the engine head.

3. A dual six-stroke self-cooling internal combustion engine as defined in claim 2, where said compressed cool air from said cooling cylinder will absorb the heat energy from the engine head and each said power cylinder to cool down the engine operation temperature without additional cooling equipment.

4. A dual six-stroke self-cooling internal combustion engine as defined in claim 2, where the working cycle of said primary power cylinder leads the working cycle of said secondary power cylinder by 360 degree of crankshaft rotation, the standard trailing angle between the working cycles of said cooling cylinder and said primary power cylinder is 90 degree of crankshaft rotation but the trailing angle can be adjusted from 75 degree to 95 degree of crankshaft rotation.

5. A dual six-stroke self-cooling internal combustion engines as defined in claim 2, where the standard valve opening time for the said coordinating ports is 30 degree of crankshaft rotation, however, depending on the fuel types and the engine load conditions, the valve opening time can be adjusted from 25 degree to 45 degree of crankshaft rotation.

6. A dual six-stroke self-cooling internal combustion engine as defined in claim 2 further comprises intake-charge means for increasing the volume of air intake.

7. A dual six-stroke self-cooling internal combustion engine as defined in claim 2, where said common crankshaft can be substituted with other mechanical energy transferring means connected to the output shaft.

* * * * *